US012616332B2

(12) United States Patent
Evangelisti et al.

(10) Patent No.: US 12,616,332 B2
(45) Date of Patent: May 5, 2026

(54) BREWING UNIT FOR A MACHINE FOR PREPARING COFFEE

(71) Applicant: DE'LONGHI APPLIANCES S.R.L. CON UNICO SOCIO, Treviso (IT)

(72) Inventors: Paolo Evangelisti, Treviso (IT); Nicola Piovan, Treviso (IT); Davide Bonotto, Treviso (IT)

(73) Assignee: DE'LONGHI APPLIANCES S.R.L. CON UNICO SOCIO, Treviso (IT)

( * ) Notice: Subject to any disclaimer, the term of this patent is extended or adjusted under 35 U.S.C. 154(b) by 777 days.

(21) Appl. No.: 17/925,164

(22) PCT Filed: May 12, 2021

(86) PCT No.: PCT/IT2021/050142
§ 371 (c)(1),
(2) Date: Nov. 14, 2022

(87) PCT Pub. No.: WO2021/229622
PCT Pub. Date: Nov. 18, 2021

(65) Prior Publication Data
US 2023/0180961 A1 Jun. 15, 2023

(30) Foreign Application Priority Data
May 14, 2020 (IT) ........................ 102020000010978

(51) Int. Cl.
*A47J 31/46* (2006.01)
*A47J 31/36* (2006.01)

(52) U.S. Cl.
CPC ........... *A47J 31/46* (2013.01); *A47J 31/3609* (2013.01)

(58) Field of Classification Search
None
See application file for complete search history.

(56) References Cited

U.S. PATENT DOCUMENTS 5,823,096 A 10/1998 Shih

FOREIGN PATENT DOCUMENTS

EP 0 521 561 A1 1/1993
WO WO-0051479 A2 * 9/2000 .......... A47J 31/3614

OTHER PUBLICATIONS

International Search Report and Written Opinion issued Jul. 30, 2021 in PCT/IT2021/050142.

* cited by examiner

*Primary Examiner* — John J Norton
(74) *Attorney, Agent, or Firm* — Panitch Schwarze Belisario & Nadel LLP

(57) ABSTRACT

A brewing unit for an automatic machine to make coffee beverages includes a brewing chamber closed at the lower part by a first piston and at the upper part, on the opposite side, by a second piston, a first inlet duct for the heated water, and a first outlet duct for the beverage, communicating respectively with an inlet side and with an outlet side of the brewing chamber, and a filtering element disposed in the brewing chamber.

16 Claims, 3 Drawing Sheets

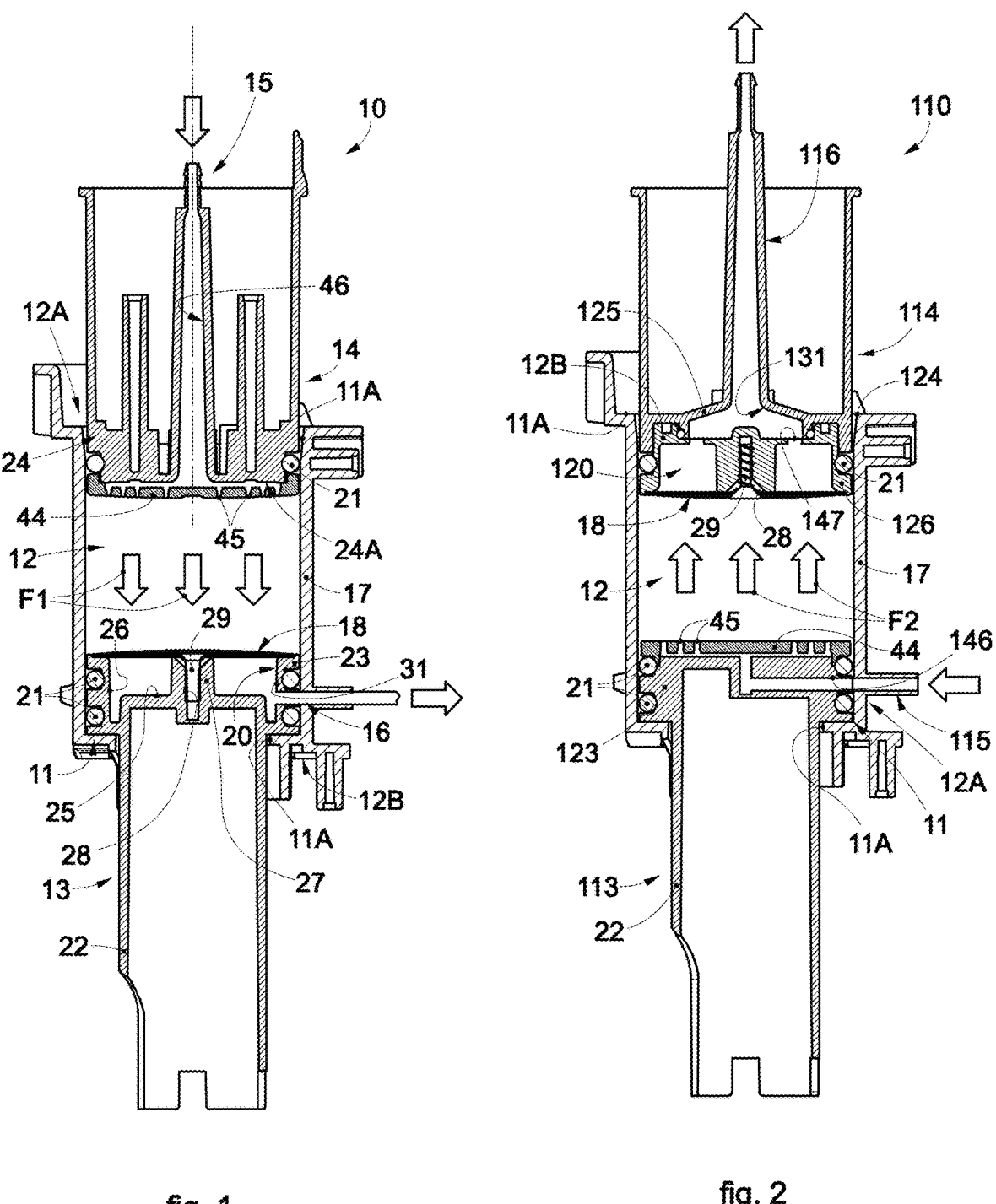
fig. 1                       fig. 2

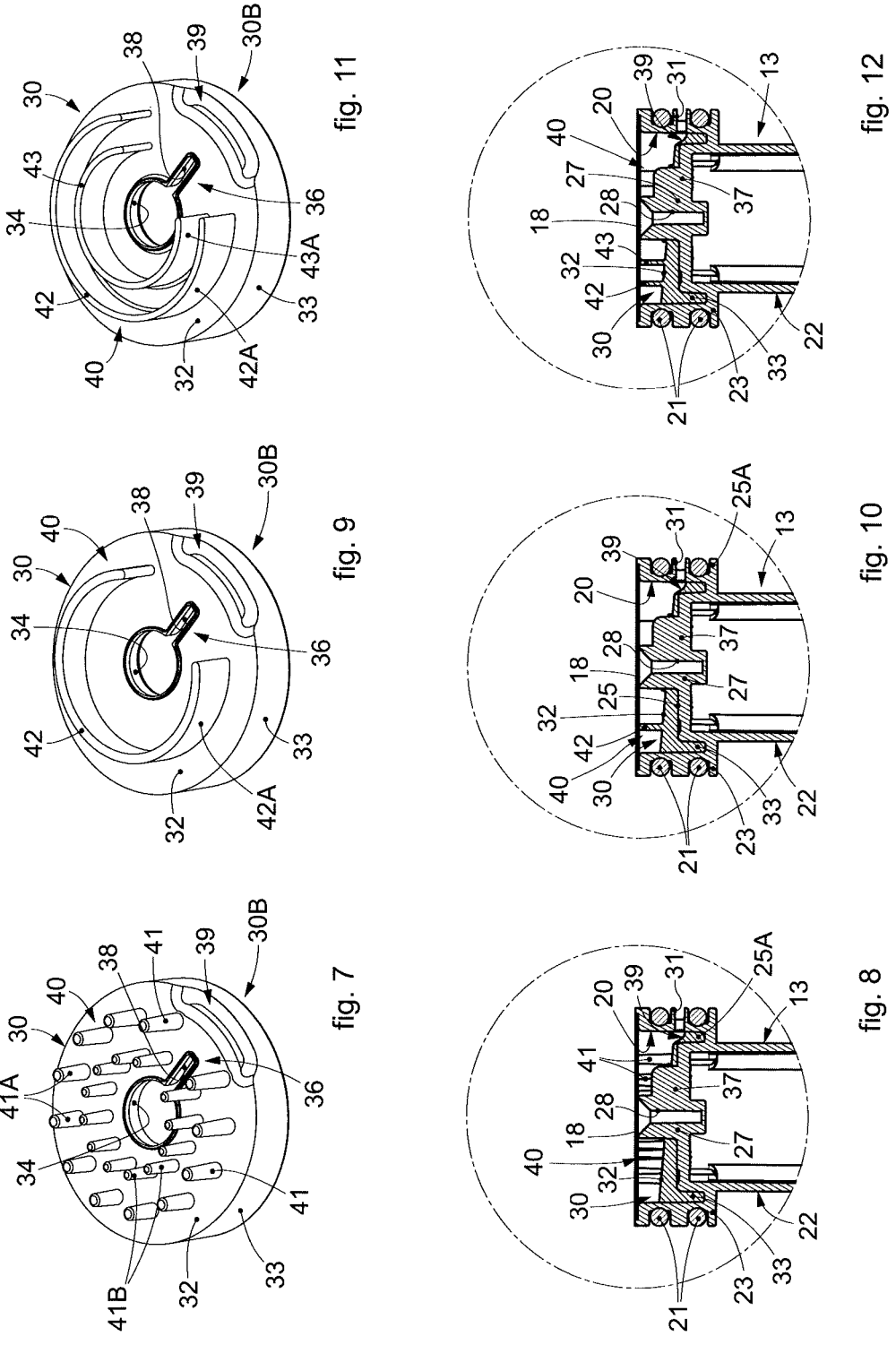

BREWING UNIT FOR A MACHINE FOR PREPARING COFFEE

CROSS-REFERENCE TO RELATED APPLICATIONS

This application is a Section 371 of International Application No PCT/IT2021/050142, filed May 12, 2021, which was published in the English language on Nov. 18, 2021, under International Publication No. WO 2021/229622 A1, which claims priority under 35 U.S.C. § 119(b) to Italian Application No. 102020000010978, filed May 14, 2020.

FIELD OF THE INVENTION

Embodiments described here concern a brewing unit for an automatic machine for preparing coffee beverages, in particular for preparing an American-type coffee beverage.

BACKGROUND OF THE INVENTION

Coffee machines are known for preparing American coffee, also called "drip coffee machines", comprising a water tank, a boiler, a brewing chamber in which a filter is positioned and into which on each occasion the coffee powder is introduced, and a container located under the brewing chamber to receive the beverage.

The water heated by the boiler is fed to the brewing chamber where, due to the effect of gravity, it percolates through the coffee powder, extracting the aromatic substances in order to obtain the coffee beverage that is collected in the container.

"Drip" type coffee machines have a simple construction, and a low production cost. One disadvantage of traditional machines is that they require manual intervention by the user both to load the coffee powder and also to remove it at the end of the preparation of the beverage.

Automatic coffee machines are also known, which comprise a device to feed the coffee powder, a boiler to heat the flow of brewing water, a mobile brewing unit comprising a brewing cylinder closed at one end by means of a first piston and defining a brewing chamber, and a second piston suitable to engage with the mobile brewing cylinder, on the opposite side with respect to the first piston, and to close the brewing chamber.

The brewing chamber is connected on one side to a water supply source, and on the opposite side to a duct to deliver the coffee beverage.

A filter element suitable to retain the coffee powder is provided between the brewing chamber and the beverage delivery duct.

In the automatic machines of the type in question, brewing units are normally used which are substantially the same as those for preparing espresso coffee, since they differ substantially only in the presence/absence of a valve to whip the crema between the filter element and the delivery duct.

However, this difference is not sufficient to make it possible to obtain an American type coffee similar to that obtained with traditional percolation machines or "drip machines".

Known types of machines for preparing coffee are described for example in EP0521561A1 and U.S. Pat. No. 5,823,096A. EP0521561A1 describes an automatic machine for preparing espresso or American type coffee, comprising a mobile brewing chamber in which the coffee powder is disposed, and drive means to move a piston to compress the coffee powder.

U.S. Pat. No. 5,823,096A describes a machine for preparing coffee comprising a mobile brewing chamber in which the coffee powder is disposed and a piston that is inserted into the brewing chamber to compress the coffee powder.

One disadvantage of known solutions is that the use of traditional brewing units entails generating froth in the coffee beverage between the outlet of the brewing chamber and the beverage delivery duct, as is actually required for a high quality espresso type coffee beverage.

The small holes in the filter element, together with the pressure that is generated in the brewing chamber, generally comprised between 1 and 3 bar, in fact, are sufficient to generate turbulent motions in the beverage, with consequent formation of air bubbles and froth, which is neither required nor desired in American-type coffee.

To solve the problem of froth generation, however, it is not possible to enlarge the diameter of the holes, since this would also entail the transit through them of the coffee powder, which would end up in the beverage dispensed, making it not compliant with the required quality standards.

One purpose of the present invention is to provide a brewing unit for a machine for preparing coffee of the automatic type, which is optimized for preparing American-type coffee at low-pressure.

Another purpose of the present invention is to provide a brewing unit which allows to obtain a coffee beverage with characteristics similar to those obtainable by percolation machines of the traditional type.

Another purpose is to provide a super-automatic coffee machine, optimized for preparing American coffee.

Another purpose is to provide a machine for preparing coffee beverages which is reliable and does not require the manual loading and unloading of the coffee powder by the user.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a brewing unit for a machine to make coffee beverages comprises a brewing chamber and, communicating with the brewing chamber, a first water supply duct, and a second beverage delivery duct, in correspondence with respective inlet and outlet sides of the brewing chamber.

The brewing chamber can be closed at one end by means of a first piston, and at the opposite end by means of a second piston suitable to engage with the brewing chamber, on the opposite side with respect to the first piston.

The inlet duct and the outlet duct are made through at least partly through a respective piston.

In the brewing chamber there is also a filtering element, disposed in correspondence with the outlet side of the brewing chamber, and comprising a plurality of holes with a diameter suitable to allow the passage through them of the liquid part only, preventing the transit of the coffee powder.

According to one aspect of the present invention, the brewing unit comprises a decanting chamber disposed downstream of the filtering element, configured to allow an accumulation and decanting of the coffee beverage therein before reaching an outlet duct for the beverage.

In this way, any turbulence of the coffee beverage, due to its passage through the holes in the filtering element, which can lead to the generation of air bubbles and therefore foam, are eliminated before the delivery of the beverage.

According to some embodiments, in the decanting chamber there are disposed diversion and guide means having the purpose of conveying and possibly intercepting the flow of the coffee beverage, so as to divert it and make it follow an indirect path toward an outlet aperture of the decanting chamber.

The diversion and guide means allow to slow down the flow of the beverage, attenuating possible turbulent motions and allowing the dispersion of the air bubbles. In this way, when the flow of beverage reaches the outlet aperture, it is substantially without foam and crema, and the beverage obtained is therefore such as to meet the standards required for an American type coffee beverage.

In this way, an American type coffee beverage is obtained which is substantially the same as that obtained by percolation, but in shorter times and without the need to manually load and empty the brewing chamber for each beverage preparation.

According to some embodiments, the decanting chamber has a height comprised between 1 and 8 mm, and preferably greater than 2 mm, so as to create a sufficiently wide space, reducing the possibility of mixing and turbulent motion of the coffee beverage.

According to some variants, the brewing unit comprises a removable insert, configured to be positioned, during use, in the decanting chamber, on which the diversion and guide means as above are made.

According to other variants, the diversion and guide means are made directly on the head of the piston in which the decanting chamber is provided. According to some embodiments, at least one of either the insert or the decanting chamber can have an inclined bottom wall in order to convey the flow toward the outlet aperture.

Providing the use of an insert inside the decanting chamber, which can be easily removed from it, however, provides an advantage in terms of maintenance and cleaning of the brewing unit, also considering the fact that the coffee beverage tends to dirty a lot, due to the percentage of residual solids present therein.

Furthermore, providing a removable insert allows to modify the machine rapidly, adapting it to different needs, simply by replacing one insert with another having a different conformation and/or different flow-guide means.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 1 is a section view of a brewing unit in a closed condition according to some embodiments described here;

FIG. 2 is a section view of a brewing unit in a closed condition according to one variant;

4

Figures 3, 4, 5, 6:
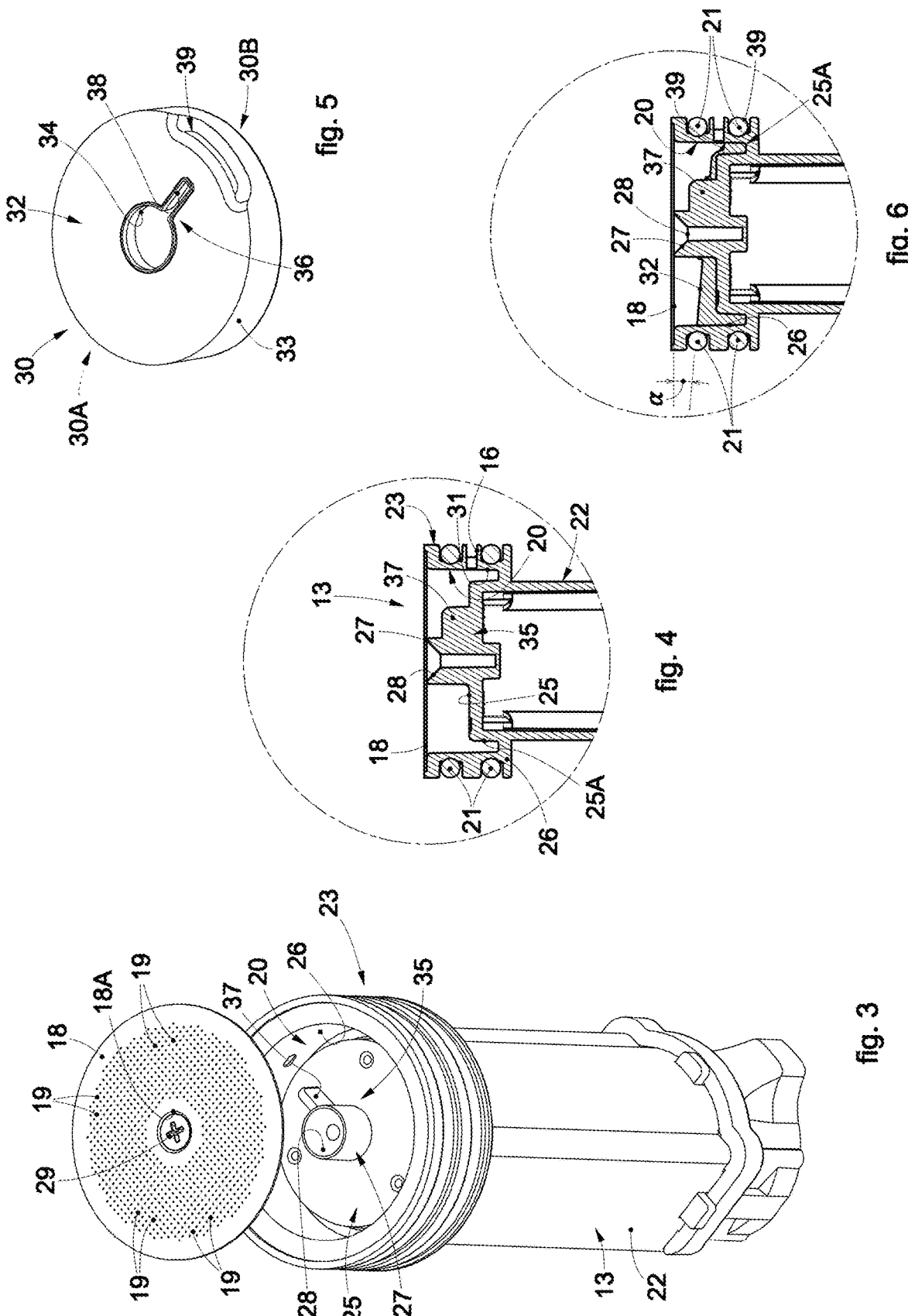
FIG. 3 is an exploded view of part of the brewing unit of FIG. 1 according to one variant.
FIG. 4 is a section view of part of a brewing unit according to some variants.
FIG. 5 is a three-dimensional view of an insert for the brewing unit according to a first embodiment.

FIG. 6 is a section view of part of a brewing unit with the insert of FIG. 5 inserted;

FIG. 7 is a three-dimensional view of an insert for the brewing unit according to a second embodiment;

FIG. 8 is a section view of part of a brewing unit with the insert of FIG. 7 inserted;

FIG. 9 is a three-dimensional view of an insert for the brewing unit according to a third embodiment;

FIG. 10 is a section view of part of a brewing unit with the insert of FIG. 9 inserted;

FIG. 11 is a three-dimensional view of an insert for the brewing unit according to a fourth embodiment;

FIG. 12 is a section view of part of a brewing unit with the insert of FIG. 11 inserted.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting example. The phraseology and terminology used here are also for the purposes of providing non-limiting examples.

Some embodiments described here with reference to FIGS. 1 and 2 concern a brewing unit 10, 110 for an automatic machine to make coffee beverages, in particular of the American type.

FIG. 1 shows a brewing unit 10 comprising an open brewing chamber 12, suitable to contain a dose of coffee powder to be subjected to brewing.

The brewing chamber 12 is generally open, and is closed at the lower part by a first piston 13.

The first piston 13 is preferably disposed slidable inside the brewing chamber 12 along a longitudinal axis X thereof.

The first piston 13 comprises a head portion 23 disposed inside the brewing chamber 12, and a rod 22 which is guided slidingly in a through hole 11A of a bottom wall 11 of the brewing chamber 12 and extends from the external side of the bottom wall 11.

The head portion 23 is provided with perimeter packings 21 suitable to cooperate with the lateral walls 17 of the brewing chamber 12 in order to obtain a hydraulic seal therewith.

The brewing unit 10 also comprises a second piston 14 configured to engage with the brewing chamber 12 on the opposite side with respect to the first piston 13, and close the brewing chamber 12 at the upper part.

According to some embodiments, the brewing chamber 12 together with the first piston 13 define a mobile assembly, and cooperate with the second piston 14 in correspondence with a brewing zone of a machine to make coffee beverages.

The second piston 14 comprises a head portion 24 disposed, during use, inside the brewing chamber 12, and slidable along the longitudinal axis X, which is provided with perimeter packings 21 suitable to cooperate with the lateral walls 17 of the brewing chamber 12 in order to obtain a hydraulic seal.

The brewing unit 10 comprises a first inlet duct 15 for the heated water, communicating with an inlet end 12A of the brewing chamber 12, and a second outlet duct 16 for the beverage, communicating with an outlet end 12B.

The inlet duct 15, during use, is connected to a tank, or other water supply source, not shown, while the outlet duct 16, during use, is connected to a beverage delivery nozzle, not shown.

According to the embodiment described with reference to FIG. 1, the inlet duct 15 is made at least partly through in the second piston 14, while the outlet duct 16 is made at least partly through in the first piston 13. In this case, the flow of the water and of the coffee beverage follows a direction from top to bottom, in the direction indicated by the arrows F1.

In the second piston 14 there is made at least one water supply channel 46, which defines the terminal portion of the inlet duct 15 downstream of the brewing chamber 12.

According to some embodiments, in correspondence with one end 24A of the head portion 24 of the second piston 14 there is disposed a perforated element 44, provided with a plurality of through holes 45 through which the water coming from the supply duct 46 is diffused on top of the coffee powder, so that the water is distributed homogeneously and uniformly.

According to one aspect of the present invention, the brewing unit 10 comprises a filtering element 18 disposed, during use, in the brewing chamber 12, in correspondence with the end facing toward the outlet duct 16, and provided with a plurality of through holes 19. These through holes 19 have a diameter suitable to allow the passage of the coffee beverage through them, and at the same time prevent the transit of the damp, or dry, coffee powder.

According to one aspect of the present invention, the brewing unit 10 comprises a decanting chamber 20, disposed between the filtering element 18 and the outlet duct 16, and configured to allow the coffee beverage to accumulate inside it and to slow down its flow toward the outlet duct 16.

In this way, any air bubbles in the coffee beverage, which could lead to the presence of foam in the beverage delivered, have time to disperse and dissolve, so that the coffee beverage that is delivered by the delivery nozzle has characteristics comparable to those of a beverage obtained by percolation in a traditional "drip" type machine.

According to some embodiments, the decanting chamber 20 is made inside the head portion 23 of the first piston 13, said head portion 23 therefore being at least partly hollow.

In particular, the head portion 23 is open at the upper part and closed by means of the filtering element 18.

According to some embodiments, the head portion 23 has the shape of a cup, defined by a bottom wall 25 and by one or several lateral walls 26, which delimit the decanting chamber 20.

By way of example, the decanting chamber 20 can have a volume comprised between ⅟₃₀ and ⅓ of that of the brewing chamber.

According to other embodiments, the volume of the decanting chamber 20 can be comprised between ⅟₁₀ and ⅓ of the brewing chamber 12.

According to some embodiments, the decanting chamber 20 has a height comprised between 1 and 8 mm, as a function of the performance required by the machine and the production speed of the American type coffee. Preferably, the height of the decanting chamber 20 is comprised between 2 and 8 mm. The height can be defined by the height of the lateral walls 26, or by the distance between the bottom wall 25 and the upper edges of the lateral walls 26.

The sizes of the decanting chamber 20, together with the passage speed of the coffee beverage, can determine a time during which the beverage passes between the filtering element 18 and the outlet of the decanting chamber 20 which is much greater than that provided in known machines.

By way of example, the time during which the decanting chamber 20 is passed through can he comprised between 1 sec and 8 sec, sufficient to eliminate any unwanted air bubbles.

According to some embodiments, the filtering element 18 is positioned on the upper edge of the lateral walls 26.

The head portion 23 can comprise a support portion 27 protruding from a central zone of the bottom wall 25, having a height coherent with that of the lateral wall(s) 26.

This support portion 27 is configured to support the filtering element 18 in the central zone, so as to prevent any deformations thereof during the operations of compression and subsequent expulsion of the exhausted coffee powder.

In fact, in order to adequately compress the exhausted coffee powder and make the residual water escape, a high compression force is required, of the order of 0.2-0.5 kg/cm2, and therefore, if not correctly supported, the filtering element 18, since it is distanced from the bottom wall 25, could be deformed by the contrast with the coffee powder.

The support portion 27 can have a cavity 28, possibly threaded, into which an attachment member 29, for example a screw, can be inserted in order to attach the filtering element 18, passing through a through aperture 18A made therein.

According to some embodiments, the outlet duct 16 communicates with the decanting chamber 20 by means of an outlet aperture 31 made through in a lateral wall 26.

The outlet duct 16, according to the embodiment shown in FIG. 1, transits through the lateral wall 26 of the decanting chamber 20 and the lateral wall 17 of the brewing chamber 12.

According to some embodiments, the bottom wall 25 can have a flat shape, substantially parallel to a horizontal plane, or it can be inclined with respect thereto toward the outlet aperture 31 in order to convey the coffee beverage toward it.

According to some embodiments, described for example with reference to FIGS. 5-12, the brewing unit 10 can comprise diversion and guide means 40, disposed in the decanting chamber 20, having the purpose of conveying the flow of the coffee beverage, so as to divert it and make it follow an indirect path toward the outlet aperture 31. The diversion and guide means 40 in particular have the function of slowing down the flow of beverage downstream of the filtering element 18 in order to prevent the presence of residual air bubbles in the coffee beverage.

In this way, if the coffee beverage comprises air bubbles, thanks to the passage of the flow of beverage in contact with the diversion and guide means 40, said air bubbles have time to dissolve and disperse before the beverage exits the brewing unit 10.

According to a first embodiment, described with reference to FIGS. 7 and 8, the diversion and guide means 40 can comprise a plurality of pins, or pegs 41 which extend in an orthogonal direction with respect to a reference surface 25, 32.

According to possible embodiments, the pins, or pegs 41 can have a cylindrical, conical, or truncated cone shape, with a rounded section, so as to limit the onset of turbulent motion.

The pins, or pegs 41 can be distributed in a matrix, or even along circumferences that are concentric with respect to the through slit 34, leaving the path free in the proximity of the outlet aperture 31.

It can also be provided that the pins, or pegs 41B on a more internal circumference have a different shape or size with respect to the pins, or pegs 41A disposed on an external circumference, for example they are smaller.

According to one variant, described with reference to FIGS. 9-12, the diversion and guide means 40 can comprise one or more annular protrusions 42, 43, having an arc shape open toward the outlet aperture 31.

In this way, at least the portion of coffee beverage that flows in the zone comprised between the lateral wall 26 and the annular protrusion 42, 43, flows in contact with an external surface 42A, 43A of the latter and is conveyed toward the outlet aperture 31.

Thanks to the fact that the flow of beverage flows in contact with the external surface 42A, 43A, the flow is slowed down and the possibility of turbulent motions that could lead to the generation of air bubbles and therefore foam is reduced.

According to some embodiments, the at least one annular protrusion 42 can be disposed at an intermediate radial distance between the through slit 34 and the external edge of the upper surface 32, so as to divide the decanting chamber 20 into two parts.

According to the embodiment shown by way of example in FIGS. 9 and 10, there is only one annular protrusion 42, disposed at an intermediate distance comprised between about 50% and about 30% of the radius from the lateral wall 26 of the decanting chamber 20, dividing the latter into two parts having similar sizes to each other.

According to other embodiments, described with reference to FIGS. 11 and 12, there can be provided two or more annular protrusions 42, 43, in the shape of an annular crown or an arc, which are open toward the outlet aperture 31, disposed concentric to each other, each suitable to act as a division in order to divert a portion of flow of coffee beverage, and at the same time convey it toward the outlet aperture 31.

According to some embodiments, in the case of two annular protrusions 42, 43, these can be disposed in such a way as to divide the decanting chamber 20 into zones having a same size in a radial direction.

According to some embodiments, the brewing unit 10 can comprise a removable insert 30 configured to be positioned, during use, in the decanting chamber 20, said insert 30 being provided with the diversion and guide means 40.

According to some embodiments, for example described with reference to FIGS. 7-12, the diversion and guide means 40 extend from an upper surface 32 of the insert 30, in a direction transverse with respect thereto.

According to some embodiments, the insert 30 has a plan shape mating with the shape of the section of the decanting chamber 20 and comprises the upper surface 32, which is substantially flat, and lateral support walls 33 which extend on the opposite side with respect to the upper surface 32, which are configured to cooperate with the bottom wall 25.

For example, the lateral support walls 33 can be inserted into a perimeter groove 25A made in the bottom wall of the decanting chamber 20 (FIG. 4).

According to some embodiments, in the upper surface 32 there is a through slit 34 suitable to allow the passage of the support portion 27.

According to some embodiments, the insert 30 has a variable height, so that the upper surface 32 has a downward inclination between a first side 30A and a second side 30B of the insert 30, which are opposite with respect to a central axis, wherein the second side 30B faces, during use, toward the outlet aperture 31.

For example, the upper surface 32 can have an angle of inclination a comprised between 5° and 20°.

According to other embodiments, in correspondence with the second side 30B, the insert 30 comprises a shaped portion 39, hollowed in the upper surface 32 and in the support wall 33, configured to act as a chute and lead-in for the beverage toward the outlet aperture 31.

According to some solutions, the decanting chamber 20 and the insert 30 are provided with respective first 35 and second coupling members 36 configured to cooperate with each other and guarantee a correct and stable positioning of the insert 30 in the decanting chamber 20.

According to possible variants, not shown, it can also be provided that the upper surface 32 of the insert 30 has an upward convex shape, possibly flattened in the central portion, degrading toward the external edge at least in the portion facing toward the second side 30B, in order to convey the flow of beverage toward the outlet aperture 31.

The coupling members 35, 36 can be configured to allow a quick and removable coupling, for example by means of mechanical same shape coupling, or with bayonet systems, toothed elements, or suchlike.

According to possible embodiments, described with reference to FIGS. 3-12, the first coupling members 35 can comprise a protruding portion 37 which extends radially from one side of the support portion 27 and the second coupling members 36 can comprise a slot 38 mating in shape, which extends from the through slit 34.

According to some embodiments, if the diversion and guide means 40 comprise at least one annular protrusion 42, 43, this can be disposed at a radial distance that is intermediate between the through slit 34 and the external edge of the upper surface 32.

In the event that two or more annular protrusions 42, 43 are present, these can be disposed equally distanced between the through slit 34 and the external edge of the upper surface 32.

According to other embodiments, not shown, it can be provided that the decanting chamber 20 is itself provided with the diversion and guide means 40, protruding directly from the bottom wall 25.

The solution that provides the use of inserts 30, however, allows for better cleaning and maintenance of the brewing unit 10.

With reference to FIG. 2, we describe a brewing unit 110 in accordance with a second embodiment. The elements common to the first embodiment shown in FIG. 1 are indicated with the same numbers, while corresponding but different elements are indicated with the numbers used in FIG. 1 increased by 100.

The brewing unit 110 comprises a brewing chamber 12, closed at the lower part by a first piston 113 disposed slidable therein, and a second piston 114 which cooperates, during use, with the brewing chamber 12, on the opposite side with respect to the first piston 113.

According to this embodiment, an inlet conduit 115 is at least partly made through in the first piston 113, while an outlet conduit 116 is at least partly made through in the second piston 114. In this case, the water and the beverage flow from the bottom upward, in the direction indicated by the arrows F2.

Unlike what is provided in the embodiment of FIG. 1, the filtering element 18 in this case is associated with a head portion 123 of the first piston 113, while the perforated element 44 is associated with a head portion 124 of the second piston 114.

The first piston 113 comprises a head portion 123 disposed inside the brewing chamber 12, and a rod 22 which is guided slidingly in a through hole 11A of a bottom wall 11 of the brewing chamber 12 and extends from the external side of the bottom wall 11.

The head portion 123 is provided with perimeter packings 21 suitable to cooperate with the lateral walls 17 of the brewing chamber 12 in order to obtain a hydraulic seal therewith.

Inside the head portion 123, a water supply duct 146 can be made, which defines a terminal portion of the inlet duct 115.

In this case, the perforated element 44 is disposed slightly raised with respect to one end 123A of the head portion 123, so as to allow the water being fed to distribute itself uniformly through the through holes 45.

According to one aspect of the present invention, the brewing unit 110 comprises a decanting chamber 120, disposed between the filtering element 18 and the outlet duct 116, and configured to allow the coffee beverage to accumulate inside it and to slow down its flow toward the outlet duct 16.

According to these embodiments, the decanting chamber 120 is made inside the head portion 124 of the second piston 114, which, therefore, is at least partly hollow.

In particular, the head portion 124 is open at the lower part and closed by means of the filtering element 18.

In this case, the decanting chamber 120 can have the shape of an inverted cup, defined by a bottom wall 125, or upper wall, and by one or more lateral walls 126, which delimit the decanting chamber 120 toward the top.

According to some embodiments, the upper wall 125 can have a frusto-conical shape, which narrows toward the outlet duct 116.

In this case, the outlet aperture 131 can be defined by the upper end of the upper wall 125.

Also in this case, there can be a support portion 127 suitable to act as a support for the filtering element 18 in correspondence with the central portion, in a manner similar to what previously described, making it suitable to withstand the compression forces required.

The support portion 127 can be connected to at least one of either the upper wall 125 or the lateral wall 126, by means of a flange 147.

Also according to this embodiment, the diversion and guide means 40 can be directly made in the decanting chamber 120, protruding from its upper wall 125, or provided on a removable insert 30.

It is clear that modifications and/or additions of parts may be made to the brewing unit 10, 110 as described heretofore, without departing from the field and scope of the present invention, as defined by the claims.

In the following claims, the sole purpose of the references in brackets is to facilitate reading: they must not be considered as restrictive factors with regard to the field of protection claimed in the specific claims.

The invention claimed is:

1. A brewing unit (10; 110) for an automatic machine to make coffee beverages, comprising:
    a brewing chamber (12) closed at the lower part by a first piston (13; 113) and at the upper part, on the opposite side, by a second piston (14; 114),
    a first inlet duct (15; 115) for the heated water, and a first outlet duct (16; 116) for the beverage, communicating respectively with an inlet side (12A) and with an outlet side (12B) of said brewing chamber (12), and
    a filtering element (18) disposed in said brewing chamber (12), a decanting chamber (20; 120) disposed downstream of said filtering element (18) and upstream of said outlet duct (16) in the direction of the flow of water, and
    diversion and guide means (40) disposed in said decanting chamber (20; 120) and having the function of conveying the flow of beverage so as to divert it and make it follow an indirect path toward an outlet aperture (31; 131) of said decanting chamber (20; 120).

2. The brewing unit (10, 110) as in claim 1, wherein said decanting chamber (20; 120) is made in a head portion (23; 124) of a respective piston (13; 114) associated with the outlet side (12B) of said brewing chamber (12).

3. The brewing unit (10, 110) as in claim 2, wherein said head portion (23; 124) is at least partly hollow, defined by a bottom wall (25; 125) and one or more lateral walls (26; 126), and comprising a support portion (27; 127) configured to support said filtering element (18) in a central zone, and the outlet aperture (31; 131) communicating with said first outlet duct (16; 116).

4. The brewing unit (10, 110) as in claim 1, wherein said decanting chamber (20; 120) has a height comprised between 1 and 8 mm.

5. The brewing unit (10, 110) as in claim 1, wherein said diversion and guide means (40) comprise a plurality of pins, or pegs (41) disposed according to a predefined pattern.

6. The brewing unit (10, 110) as in claim 1, wherein said diversion and guide means (40) comprise at least one annular protrusion (42, 43) having the shape of an arc open toward said outlet aperture (31; 131).

7. The brewing unit (10, 110) as in claim 6, wherein there is provided only one annular protrusion (42, 43) disposed coaxial to said decanting chamber (20; 120).

8. The brewing unit (10, 110) as in claim 6, wherein there are provided at least two arc-shaped annular protrusions (42, 43) disposed concentric to each other.

9. The brewing unit (10, 110) as in claim 8, wherein said at least two annular protrusions (42, 43) divide said decanting chamber (20) into zones having the same size in a radial direction.

10. The brewing unit (10, 110) as in claim 6, wherein said at least one, or each, annular protrusion (42, 43) extends for a circular sector comprised between 240° and 280°.

11. The brewing unit (10, 110) as in claim 1, wherein it comprises a removable insert (30) on which said diversion and guide means (40) are provided, which is configured to position itself, during use, in said decanting chamber (20; 120).

12. The brewing unit (10, 110) as in claim 11, wherein said insert (30) has an upper surface (32) inclined downward between a first side (30A) and a second side (30B), which are opposite with respect to a central axis, wherein the second side (30B) faces, during use, toward the outlet aperture (31; 131).

13. The brewing unit (10, 110) as in claim 12, wherein in correspondence with the second side (30B), said insert (30) comprises a shaped portion (39), hollowed in said upper surface (32) and configured to act as a chute and lead-in for the beverage toward said outlet aperture (31).

14. The brewing unit (10, 110) as in claim 12, wherein said decanting chamber (20; 120) and said insert (30) are provided with respective first (35) and second coupling members (36) configured to cooperate with each other and guarantee a correct and stable positioning of the insert (30) in said decanting chamber (20; 120).

15. The brewing unit (10, 110) as in claim 1, wherein said diversion and guide means (40) are made in a head portion (23; 124) of the piston (13; 114) that is associated with said outlet side (12B) of said brewing chamber (12).

16. An automatic machine to make coffee beverages, comprising:

a brewing unit (10; 110) as in claim 1, a water supply source connected to said first inlet duct (15; 115), and a beverage delivery nozzle connected to said first outlet duct (16; 116).

\* \* \* \* \*